June 19, 1923.
L. DE WOLF
1,459,018
RESILIENT WHEEL AND TIRE
Filed April 13, 1920
3 Sheets-Sheet 2
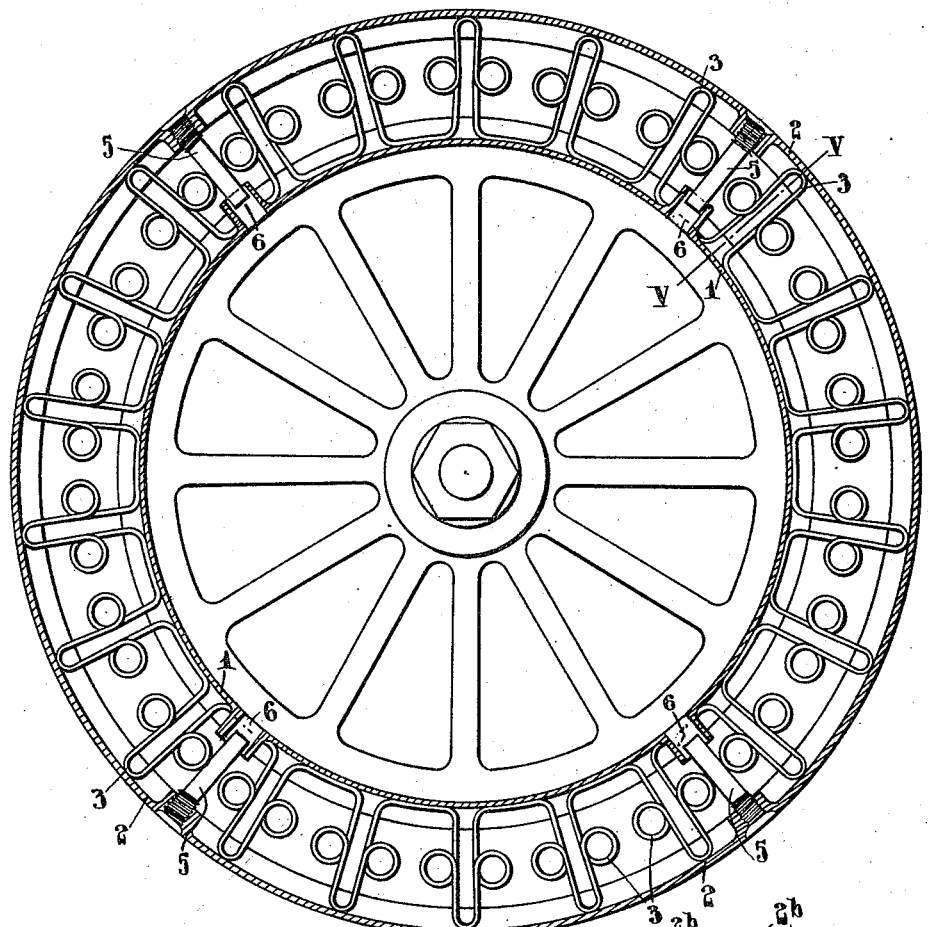
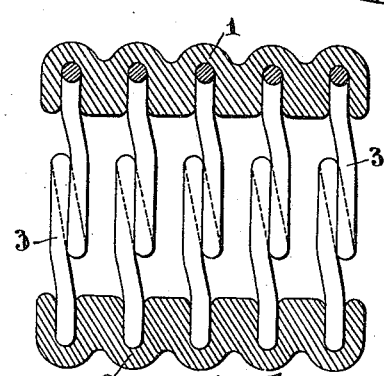
Fig. 7.
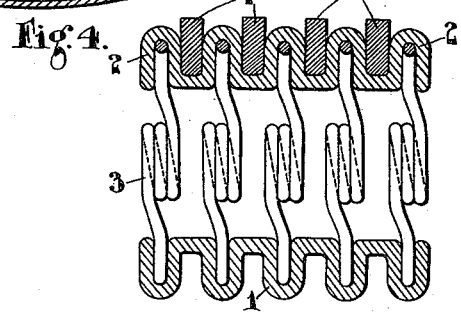
Fig. 4.
Fig. 6.
Inventor
L. De Wolf,
By H. R. Kerslake
Attorney Patented June 19, 1923.

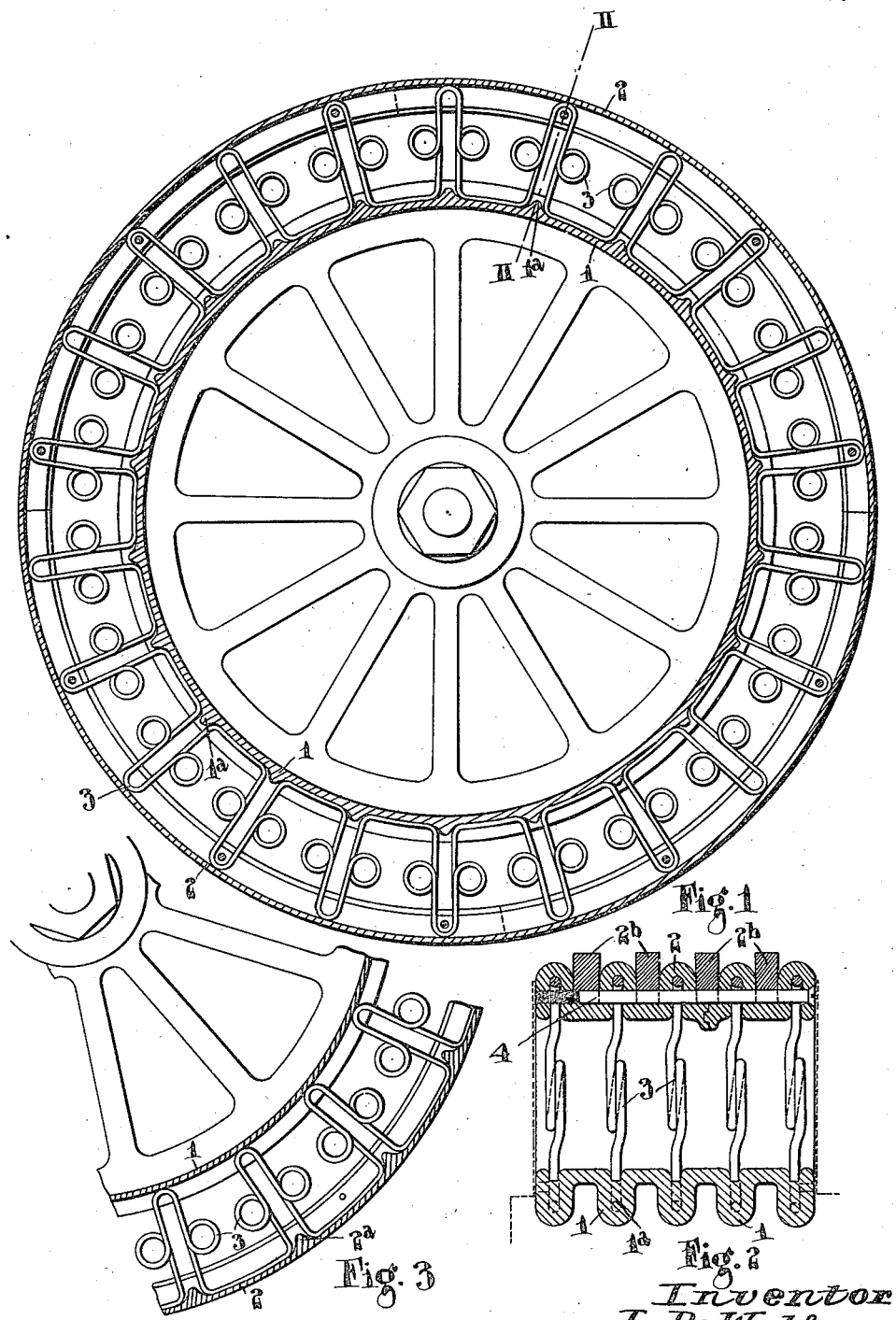

1,459,018

UNITED STATES PATENT OFFICE.

LEON DE WOLF, OF ST. NICOLAS, BELGIUM.

RESILIENT WHEEL AND TIRE.

Application filed April 13, 1920. Serial No. 373,568.

(GRANTED UNDER THE PROVISIONS OF THE ACT OF MARCH 3, 1921, 41 STAT. L., 1313.)

*To all whom it may concern:*

Be it known that I, LEON DE WOLF, a subject of the King of Belgium, and residing at 45 Rue De Plaisance, St. Nicolas, W., Belgium, have invented certain new and useful Improvements in and Relating to Resilient Wheels and Tires (for which I have filed applications in Great Britain April 14, 1920, No. 152984; in Belgium October 22, 1919, No. 282951, and in Great Britain October 3, 1918 and abandoned on February 16th, 1920), of which the following is a specification.

The present invention relates to resilient wheels of the kind comprising a plurality of normally concentric rim members and a plurality of resilient elements arranged between and at intervals around the rim members.

The present invention has for its object to provide an improved resilient wheel of the above kind and with this end in view the invention is characterized by the fact that the resilient elements each comprise a length of resilient metal wire bent to form a pair of substantially radial and parallel limbs connected at one end and adapted to extend between the rim members, the said radial limbs being formed with helical convolutions.

The invention further consists in providing a series of resilient elements formed from a continuous length of resilient metal wire, each element of the series being formed in the manner above specified.

The invention moreover consists in providing a plurality of series of resilient elements of the character above specified, each series lying in a plane parallel to the other series.

The invention further consists in providing the rim members with circumferential grooves in which the ends of the radial resilient members engage.

The invention still further consists in providing one of the rim members with a number of radial rods which engage in suitably shaped guide holes in the other rim member but prevent lateral relative movement of the rim members while permitting the requisite relative movement of the rim members in the plane of the wheel.

Certain embodiments of the invention are illustrated by way of example in the accompanying drawings, in which:—

Figure 1 is a sectional elevation of one construction;

Figure 2 is a cross section on the line II—II of the tire portion of the construction illustrated in Figure 1;

Figure 3 is a sectional elevation of a portion of a wheel of somewhat different construction;

Figure 4 is a sectional elevation of a wheel of another construction;

Figure 5 is a view in cross section of the tire portion of the wheel illustrated in Figure 4 on the line V—V thereof;

Figure 6 is a view in cross-section of a tire element having spring elements the radial portions of which each comprise two complete turns of a helix;

Figure 7:
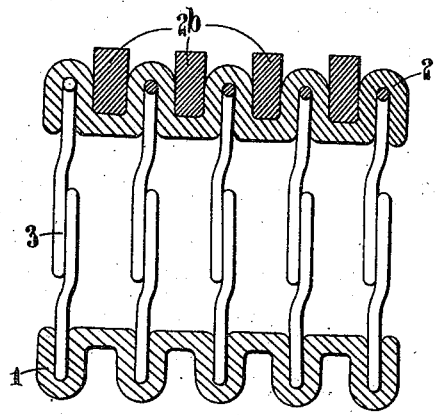
Figure 7 is a view in cross-section of a tire having a metal wearing surface.
Figure 8:
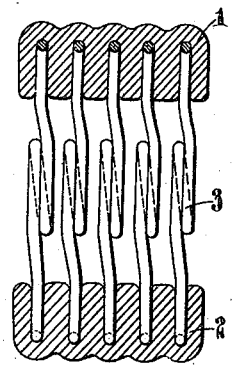
Figure 8 is a similar view of a tire of this kind having inner and outer rim portions of thicker material than has the construction shown in Figure 7.

In the drawings, 1 is the felloe portion of the spring tire, 2 the tire portion, 3 the spring elements which, as will be observed, are engaged in grooves in the rim portions. In the construction shown in Figure 1, projections 1$^a$ are provided in the felloe portion and in the construction illustrated in Figure 3 projections 2$^a$ are provided on the inner surface of the tire portion to aid in preventing relative movement between the rim and the spring elements. The tire portion of the rim in the construction shown in Figures 1 and 2 is split, screws 4 being employed to secure the sections of the tire portion together, such screws also aiding in securing the spring elements in their place, any suitable means being employed for preventing relative lateral displacement of the tire and felloe portions.

In the construction illustrated by Figure 4, rods 5 are screwed into the outer rim portion, their stems engaging in apertures 6 provided in the inner rim portion and of slightly greater diameter than said rods, for the purpose of guiding the rods and thus preventing the inner and outer rim portions being displaced laterally to an undesirable extent relatively to one another.

As shown in Figures 2, 5, and 6, bands of rubber or other suitable resilient material 2ᵇ may be arranged in grooves in the outer rim portion of the tire.

Having now described my invention what I claim as new and desire to secure by Letters Patent is:—

1. A wheel of the kind comprising normally concentric tire and felloe portions with interposed resilient elements characterized by the fact that the resilient elements are formed as radial projections formed from a continuous length of resilient metal bedded in circumferential grooves in the felloe portion of the wheel, said projections being given a U shape and being provided with helical convolutions on each arm of the U.

2. A wheel of the kind comprising normally concentric tire and felloe portions with interposed resilient elements characterized by the fact that the resilient elements are formed as radial projections formed from a continuous length of resilient metal bedded in circumferential grooves in the felloe portion of the wheel, said projections being given a U shape and being provided with helical convolutions on each arm of the U, said resilient strips of metal being arranged in a series extending across the width of the wheel.

In testimony whereof I have signed my name to this specification.

LEON DE WOLF.